(12) United States Patent
Lister

(10) Patent No.: X906
(45) Date of Patent: Jul. 11, 1808

(54) WASHING MACHINE

(76) Inventor: Ebenezer Lister

Ebenezer Sisler.
LETTERS PATENT. Issued July 12, 1813.
The Schedule referred to in these Letters Patent and making part of the
same containing a description in the words of the said Ebenezer Sisler
himself of his Washing Machine Take two pieces of board say 5 feet long and 15 inches wide; plane them
perfectly smooth, then joint both edges straight; then with a sweep say
4 feet long sweep the under edge of each side piece beginning 9 inches
from the center of each which will leave the bottom about 18 in. flat.
then take a number of pieces of boards for the bottom, plane them
smooth and groove them together, painting each joint; then take a
strip of cloth and secure on the lower edge of the two side pieces and
then nail the bottom on, then take two pieces, say 15 in. wide &
15 in. long. or as long as the machine is wide for the end pieces, make
them perfectly smooth and nail them on so that they may be perfect-
ly tight; and the vessel which holds the water is compleat. It is
to be observed that the ends are to be level from six to ten inches,
and that a piece of board of six or eight inches in width is to be
securely fixed on the top of the machine and join with the
ends. Then take two pieces of two inch plank 3 ft. long, and
two of 20 in. long and six wide, plane & joint these smooth and
frame them together for the Wash machine to be secured on. Or
take two pieces of Plank 22 in. long and 6 in. wide; saw a piece
out of one edge of each leaving 1 1/2 inch at each end of each to
receive the machine. then with a piece of board dovetail these to
gether about 2 ft from each other, then take 4 strips of plank
say 4 feet long & 3 inches wide, plane and joint them smooth &
true; then in the upper end of each mortise a hole of 1 1/2 inch
square, then bore four or five holes in the lower end of each piece
say 3 inches apart. above this cut a gain to receive a piece of
plank with a dovetail; then take four or five Rolls of suitable
length say 14 inches long, and from 1 1/2 to 2 inches diameter put these into the lower part below the doorsill plank, then take two
pieces of joist say twenty inches long, plane and joint them true, then
at the end of each make a square to receive the squares in the upper
end of the swinging frame; without this turn a pivot one inch and
a quarter long, and one inch in diameter, or the swinging frame may be
made with jaws and hung with a hinge with a spring between the stand
ing parts and the jaws. Then take two pieces of boards say 10 inches wide,
and four feet and an half long, nail this on the outside of the machine
and in the center; then take another piece of the same width say 2 ft.
long, set one end of this on the upper edge of the machine as a lining,
to the standards which is nailed on the outside. Then take a piece
say 20 in. long and 6 in. wide; and on one edge of this saw a square
sufficient to receive the pivot in the large upper roll: setting these
rolls from 18 to 24 inches apart; nail this to the first board and resting
one edge on the lining. This standard may be made of plank by being
halved the depth of the washing machine and at the upper end to
receive the piece which supports the swinging frame. Then take two pieces
of plank or timber say 3 ft. long and reduce them suitable for han-
dles, secure these to the upper large rolls on which the swinging frame is
fastened. Then take a small pole and secure it in the frame, on which
the machine is secured; to this fasten a line and the other end of the
line to one handle; or a weight of six pounds will answer the same
purpose; or putting a spring on the lower end of one of the swinging
frames so that it will work by pressing against the piece on the top
of the machine will be equally good; as they will save one hand in the
working. It is contemplated that a washing machine on this principle
will be of utility. the purchase being in the upper Rolls and worked by
a handle of suitable length, it works very easy indeed, the Clothes be-
ing between the two swinging frames. and in the centre of the vessel
they cannot receive any injury, for the one part yielding to the other it
becomes a squeeze and a roll while one set of rolls turn upwards & the
Exd. other downwards. The above are given merely for example, the machine
W.G. and its parts may be varied as will be convenient Witnesses { William Morgan } [illegible] Ebenezer Lester (seal Wood)